United States Patent
Harvey

(10) Patent No.: US 7,612,668 B2
(45) Date of Patent: Nov. 3, 2009

(54) SYSTEM FOR PROVIDING A VIRTUAL VEHICLE BOUNDARY

(75) Inventor: John Harvey, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 292 days.

(21) Appl. No.: 11/448,344

(22) Filed: Jun. 6, 2006

(65) Prior Publication Data

US 2006/0238340 A1    Oct. 26, 2006

Related U.S. Application Data

(62) Division of application No. 10/627,531, filed on Jul. 25, 2003, now Pat. No. 7,327,250.

(51) Int. Cl.
*G08B 13/00* (2006.01)
*G08G 1/16* (2006.01)

(52) U.S. Cl. ........................ 340/550; 701/301
(58) Field of Classification Search ............. 340/550, 340/988, 425.5, 426.1, 426.19, 426.2, 426.22, 340/426.21, 990, 993; 348/148, 151, 153; 701/200, 201, 300–302

See application file for complete search history.

(56) References Cited

U.S. PATENT DOCUMENTS

| | | | |
|---|---|---|---|
| 5,172,094 A * | 12/1992 | Stadler | 340/426.11 |
| 6,067,044 A | 5/2000 | Whelan et al. | |
| 6,342,847 B1 | 1/2002 | Archuleta et al. | |
| 6,559,769 B2 | 5/2003 | Anthony et al. | |
| 6,665,613 B2 | 12/2003 | Duvall | |
| 6,816,090 B2 | 11/2004 | Teckchandani et al. | |
| 2003/0060938 A1* | 3/2003 | Duvall | 701/2 |
| 2003/0151507 A1* | 8/2003 | Andre et al. | 340/539.13 |
| 2003/0169853 A1 | 9/2003 | Moses | |
| 2004/0090950 A1* | 5/2004 | Lauber et al. | 370/352 |

FOREIGN PATENT DOCUMENTS

EP    1571637 A1 *  9/2005
JP    2005/251200 A *  9/2005

* cited by examiner

*Primary Examiner*—Jennifer Mehmood
(74) *Attorney, Agent, or Firm*—Richard Bachand; Ashish L. Patel

(57) ABSTRACT

System for providing a virtual vehicle boundary. The system includes a method for activating a virtual fence for use with a delivery vehicle. The method comprises steps of detecting a protection event, determining that the protection event is an activation event, and activating a selected virtual fence based the activation event.

31 Claims, 5 Drawing Sheets

SYSTEM FOR PROVIDING A VIRTUAL VEHICLE BOUNDARY

CLAIM OF PRIORITY UNDER 35 U.S.C. §120

The present Application for Patent is a Divisional and claims priority to patent application Ser. No. 10/627,531 now U.S. Pat. No. 7,327,250 entitled "System for Providing a Virtual Vehicle Boundary," filed Jul. 25, 2003, and assigned to the assignee hereof and hereby expressly incorporated by reference herein.

BACKGROUND

1. Field

The present invention relates generally to vehicle security systems, and more particularly, to a system for providing a virtual boundary or fence for use with vehicles.

2. Description of the Related Art

Advances in technology have provided for increased automation in many industries. For example, in the shipping industry, technology has allowed for the automatic tracking of delivery vehicles as they carry and deliver cargo virtually around the clock. Delivery vehicles now carry and deliver cargo to all parts of the country. For example, in the trucking industry, cargo-carrying tractor-trailers may be driven hundreds or thousands of miles to reach a delivery site. In some cases, the vehicle must make one or more intermediate stops before it reaches its final destination.

Typically, cargo is loaded into a trailer portion of a tractor-trailer delivery vehicle and driven from point to point along a delivery route by a vehicle operator. Along the delivery route, intermediate stops may occur where portions of the cargo are unloaded for delivery or where new cargo is picked up. To facilitate efficient routing, sometimes a trailer is detached from its current tractor and left at a designated location for pickup by another tractor. The trailer may sit at this intermediate location for various lengths of time while waiting to be retrieved by another tractor. This detachable trailer arrangement allows shippers to plan the most efficient and cost effective routes for the delivery of the cargo. In some cases, the trailer acts as a storage container to store the cargo for an extended period of time.

One problem associated with the delivery of cargo, especially in the trucking industry, is how to protect the delivery vehicle and its cargo as they progress along the delivery route. For example, as a delivery vehicle progresses along its delivery route, it may be hijacked and taken to an unknown location where the cargo may be destroyed or stolen. In another situation, the delivery vehicle may be stopped at an authorized stopping point, where cargo is delivered, picked-up or temporarily stored. During this planned stop, unauthorized persons may remove the vehicle in order to destroy or steal the cargo. Thus, protecting the vehicle and its cargo during the delivery process is important to the successful operation of the shipping business.

One technique that has been used to protect delivery vehicles and their cargo operates by creating a virtual fence, sometimes referred to as a Geofence. A Geofence is a virtual boundary created around a delivery vehicle at a predetermined distance from the vehicle's current position. In most cases, global positioning system (GPS) technology is used to establish the vehicle's location and the location of the Geofence. After the fence is established, it is possible to detect if the vehicle moves beyond the virtual boundary, and in response, take appropriate action. For example, a delivery vehicle may be stopped at a delivery site to make a cargo delivery. The vehicle operator activates a Geofence that surrounds the vehicle, and if the vehicle is moved outside the fenced area an alarm condition occurs. Thus, only after the Geofence is deactivated by authorized personal is the vehicle able to be moved without activating the alarm. Should the vehicle be hijacked or stolen while the Geofence is active, the alarm condition would occur immediately after the vehicle moves outside the fenced area.

Geofences can be used to protect a vehicle and its cargo at fixed stopping points, such as at delivery locations, and along delivery routes, to ensure that a vehicle does not leave a designated route. For example, in the trucking industry, a Geofence may be established that follows selected freeways that define the delivery route. If the vehicle takes a wrong turn or is hijacked and leaves the designated route, an alarm condition occurs when the vehicle crosses the virtual fence boundary. Thus, Geofences may be used in a variety of ways to protect delivery vehicles and their cargo.

However, one problem associated with the use of Geofences is that they are generally controlled by an operator who is responsible for activating and deactivating them. For example, when a delivery vehicle enters a fixed delivery location, it is the responsibility of the vehicle operator to enable a Geofence to protect the vehicle while it is at that location. When the vehicle is ready to proceed along the delivery route to the next stop, the vehicle operator must deactivate the Geofence before leaving the delivery location. Thus, it is possible that the vehicle operator may, for some reason, fail to enable the fence and thereby leave the vehicle and its cargo unprotected. It is also possible that the vehicle operator may fail to deactivate the Geofence upon departure from the delivery location, thereby causing a false alarm condition to occur when the vehicle crosses the fence boundary.

Therefore, what is needed is a system for use with a delivery vehicle to determine when a Geofence is required to protect the vehicle and its cargo, and in response, automatically activate the desired Geofence. The system should also operate to automatically deactivate the Geofence when it is no longer needed to avoid false alarm conditions. The system should be operable when the delivery vehicle is in route, stopped at an intermediate location, or parked to provide temporary or long-term storage for the vehicle or its cargo.

SUMMARY

In one or more embodiments, a protection system comprising methods and apparatus is provided to automatically activate and deactivate a virtual fence to protect a delivery vehicle and its cargo. For example, in one embodiment, the system operates to activate a virtual fence when the ignition of the delivery vehicle is turned off. In another embodiment, a virtual fence is activated when a trailer portion of the delivery vehicle is unhooked from a tractor portion. In another embodiment, a virtual fence is activated based on messages transmitted from the delivery vehicle to a central station. In another embodiment, a virtual fence is activated based on a duty state of the vehicle operator.

In one embodiment, a method is provided for activating a virtual fence for use with a delivery vehicle. The method comprises steps of detecting a protection event, determining that the protection event is an activation event, and activating a selected virtual fence based the activation event.

In another embodiment, a protection system is provided that operates to provide a virtual fence for use with a delivery vehicle. The protection system comprises input logic that is coupled to receive a protection signal. The protection system also comprises fence logic that is coupled to the input logic, and wherein the fence logic operates to detect an activation event based on the protection signal and activate a selected virtual fence based on the activation event.

In another embodiment, apparatus is provided that operates to provide a virtual fence for use with a delivery vehicle. The apparatus comprises means for detecting a protection event. The apparatus also comprises means for determining that the protection event is an activation event. The apparatus also comprises means for activating a selected virtual fence based on the activation event.

In another embodiment, a computer-readable medium is provided that comprises computer-executable instructions for providing a virtual fence for use with a delivery vehicle. The instructions when executed perform a method that comprises steps of detecting a protection event, determining that the protection event is an activation event, and activating a selected virtual fence based on the activation event.

BRIEF DESCRIPTION OF THE DRAWINGS

The foregoing aspects and the attendant advantages of the embodiments described herein will become more readily apparent by reference to the following detailed description when taken in conjunction with the accompanying drawings wherein.

DETAILED DESCRIPTION

The following detailed description describes a protection system for providing a virtual boundary or fence for use with a delivery vehicle. The protection system is operable to automatically activate a virtual fence and determine when the vehicle or its cargo is moved outside the predefined boundary, thereby generating an alarm condition. The alarm condition may activate a visual or audible alarm vehicle alarm, transmit a message to a central station, or activate one or more vehicle systems, such as the door locks or brakes to prevent further movement of the vehicle.

In one embodiment, the vehicle includes communication logic that allows the vehicle to communicate through a wireless communication channel to a central station. For example, in one embodiment, the vehicle communicates through a satellite-based wireless communication channel to the central station. It should also be understood that the described protection system could also be used in conjunction with virtually any type of vehicle including, but not limited to, trucks, buses, trains, aircraft, automobiles, and watercraft.

Figure 1:
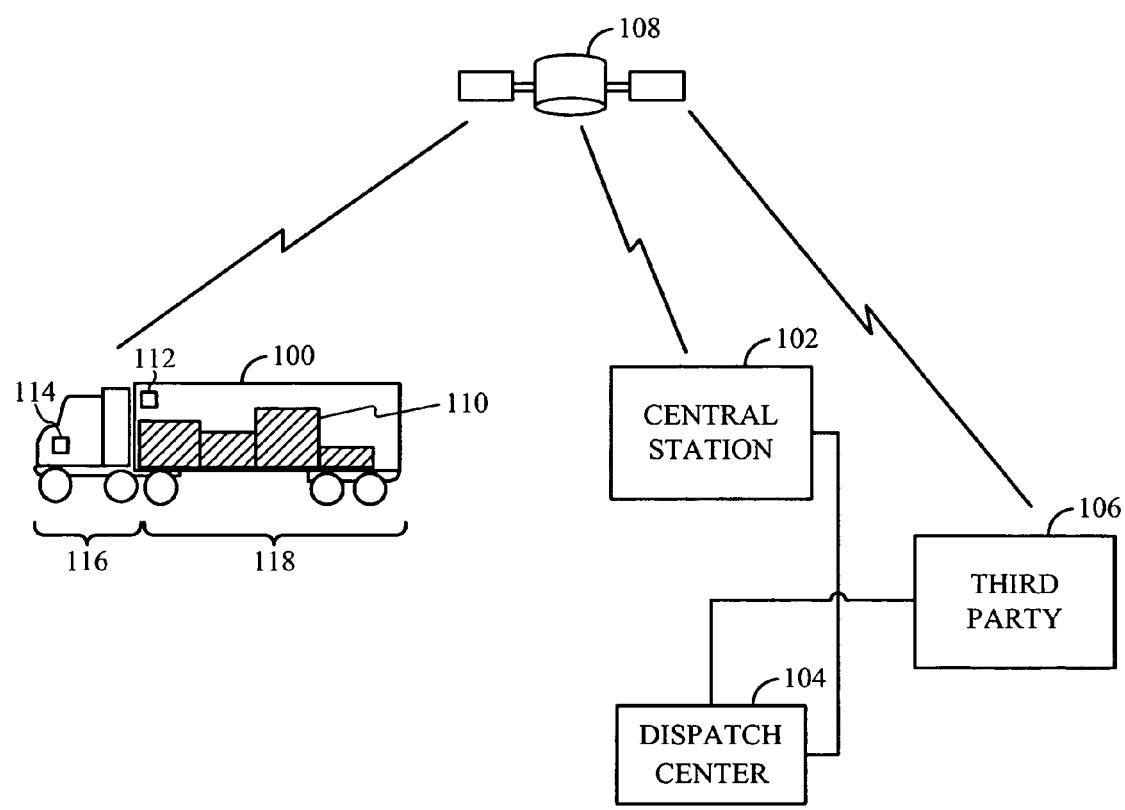
FIG. 1 shows a delivery vehicle that includes one embodiment of a protection system that operates to provide a virtual boundary or fence.

FIG. 1 shows a delivery vehicle 100 that includes one embodiment of a protection system 112 that operates to provide a virtual boundary or fence. The vehicle 100 in this embodiment comprises a tractor-trailer, commonly used in the long-haul trucking industry to transport goods from shippers to consignees. The vehicle 100 further comprises a mobile communication terminal (MCT) 114 for communicating with one or more remote locations using a satellite-based wireless communication system, including satellite 108. Generally, the MCT resides onboard a tractor portion 116 of the vehicle 100 so as to be easily accessible by the vehicle operator. The protection system 112 is located in a trailer portion 118 of the vehicle 100, which also includes cargo 110 to be delivery to one or more delivery sites.

The protection system 112 and the MCT 114 include logic to communicate with one another so that it is possible for information located at the protection system 112 to be transmitted to the MCT 114 and vice versa. In one embodiment, there are two protection systems provided where one system is located in the trailer portion to protect the trailer, and one system is located in the tractor portion to protect the tractor. In another embodiment, only one protection system is provided and that system is located in the tractor portion. In other embodiments, the protection system in the tractor portion is integrated into the MCT, or it may comprise a stand-alone device.

The MCT 114 comprises logic to communicate through a satellite-based wireless communication system widely used in the trucking industry. The communication system provides two-way communications between delivery vehicles and third parties, such as a fleet management center or dispatch center, family members, governmental authorities, consignees, shippers, and so on. In other embodiments, the MCT may communicate directly with interested parties, such as remote locations 102, 104, and 106, through, for example, a terrestrial wireless communication system.

In one embodiment, central station 102 comprises a central processing center, otherwise known as a hub, or network management center (NMC), which serves as a central communication point between MCT-equipped vehicles and their respective dispatch centers, other designated office(s), shippers, consignees, governmental authorities, family members, and so on. For example, the central station 102 may operate to pass communications between dispatch center 104 and vehicle 100. In this embodiment, dispatch center 104 comprises a vehicle dispatch center that generally monitors and controls a fleet of vehicles similar to vehicle 100.

Communications between the dispatch center 104 and vehicle 100 may further be passed to one or more other remote locations, such as third party 106. Third party 106 comprises one of any number of interested third parties that are interested in communications between dispatch center 104 and vehicle 100. For example, third party 106 could be another designated office of dispatch center 104, a shipper of goods being carried by vehicle 100, a consignee of goods being carried by vehicle 100, a governmental unit, a personal computer, and so on. Furthermore, communications between vehicle 100 and third party 106 may occur directly between the two. Communications among remote locations 102, 104, and 106 may be carried out by any known communication technique, including telephone, Internet, dedicated lines, wireless links, and so on.

The MCT 114 located on vehicle 100 transmits and receives communications wirelessly using, in one embodiment, a satellite-based wireless communication system to communicate with central station 102. Other wireless systems could be used in addition or in the alternative, such as an analog or a digital cellular telephone system, an RF communication system, or a wireless data communication network, such as a cellular digital packet data (CDPD) network.

Fence Types

In one or more embodiments, the protection system 112 provides a virtual boundary or fence. The fence is used to establish a region or area where the vehicle, trailer, and/or cargo are restricted. For example, the protection system 112 may establish a virtual fence around the vehicle while it is stopped at a delivery location. If the vehicle should be moved outside the fenced region while the fence is active, an alarm condition will occur when the vehicle crosses the fence boundary.

Several types of virtual fences may be established by the protection system 112. The following discussion provides a description of some of the possible fence types. However, the description is intended to provide representative examples of fence types and is not intended to be exhaustive of all possible fence types.

Figure 2:
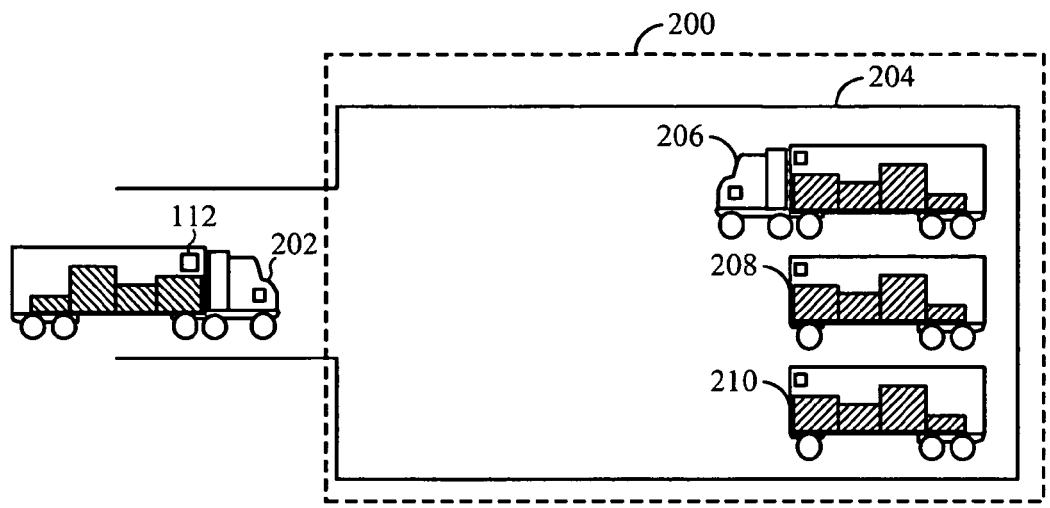
FIG. 2 shows one embodiment of a boundary fence that may be established by the protection system of FIG. 1.

FIG. 2 shows one embodiment of a boundary fence 200 that may be established by the protection system 112. The boundary fence 200 encloses a fixed location, such as a delivery location, a central shipping station, stopover station, repair yard, or other vehicle service location.

The vehicle 202 is shown entering the area 204 bounded by the boundary fence 200. In one embodiment, the protection system 112 includes a GPS receiver that determines the position of the vehicle 202. When the vehicle 202 enters the area 204, the protection system 112 establishes the virtual fence 200. If the vehicle 202 is moved outside the fenced region without deactivating the fence 200, an alarm condition will occur.

Also shown inside the area bounded by the boundary fence 200 are vehicle 206, and trailer portions 208 and 210. Each of these vehicles also includes a protection system that may establish the boundary fence 200 for their protection from unauthorized removal.

Figure 3:
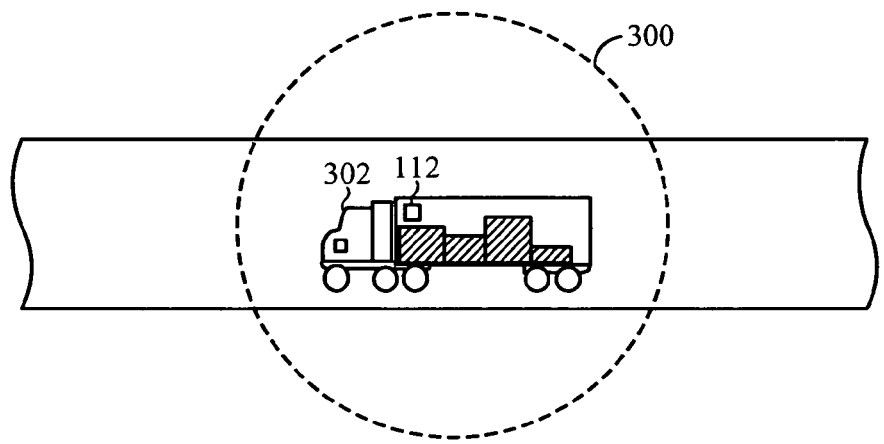
FIG. 3 shows one embodiment of a perimeter fence that may be established by the protection system of FIG. 1.

FIG. 3 shows one embodiment of a perimeter fence 300 that may be established by the protection system 112. The perimeter fence 300 encloses the vehicle 302 at its current location. For example, the vehicle 302 may be stopped in-route because of a break-down, emergency situation, rest stop, refueling, heavy traffic condition or any other reason for a temporary stop. The perimeter fence 300 operates to protect the vehicle 302 and its cargo during the stop. For example, if the vehicle 302 is moved beyond the boundary of the perimeter fence 300 without deactivating the fence, an alarm condition occurs.

Figure 4:
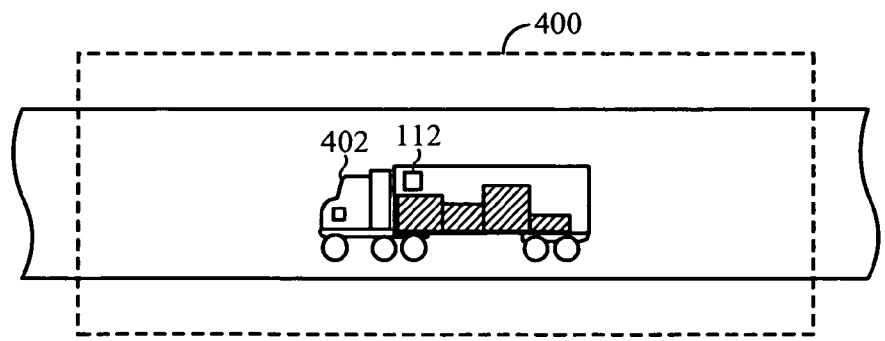
FIG. 4 shows one embodiment of a route fence that may be established by the protection system of FIG. 1.

FIG. 4 shows one embodiment of a route fence 400 that may be established by the protection system 112. The route fence 400 has boundaries along a route that the vehicle 402 will travel from its source to its destination. For example, the route fence 400 establishes boundaries along the freeways and roadways that define a route between a start location and a destination location. Thus, if the vehicle 402 is taken outside the predefined route and crosses a boundary of the route fence 400, an alarm condition will occur.

Figure 5:
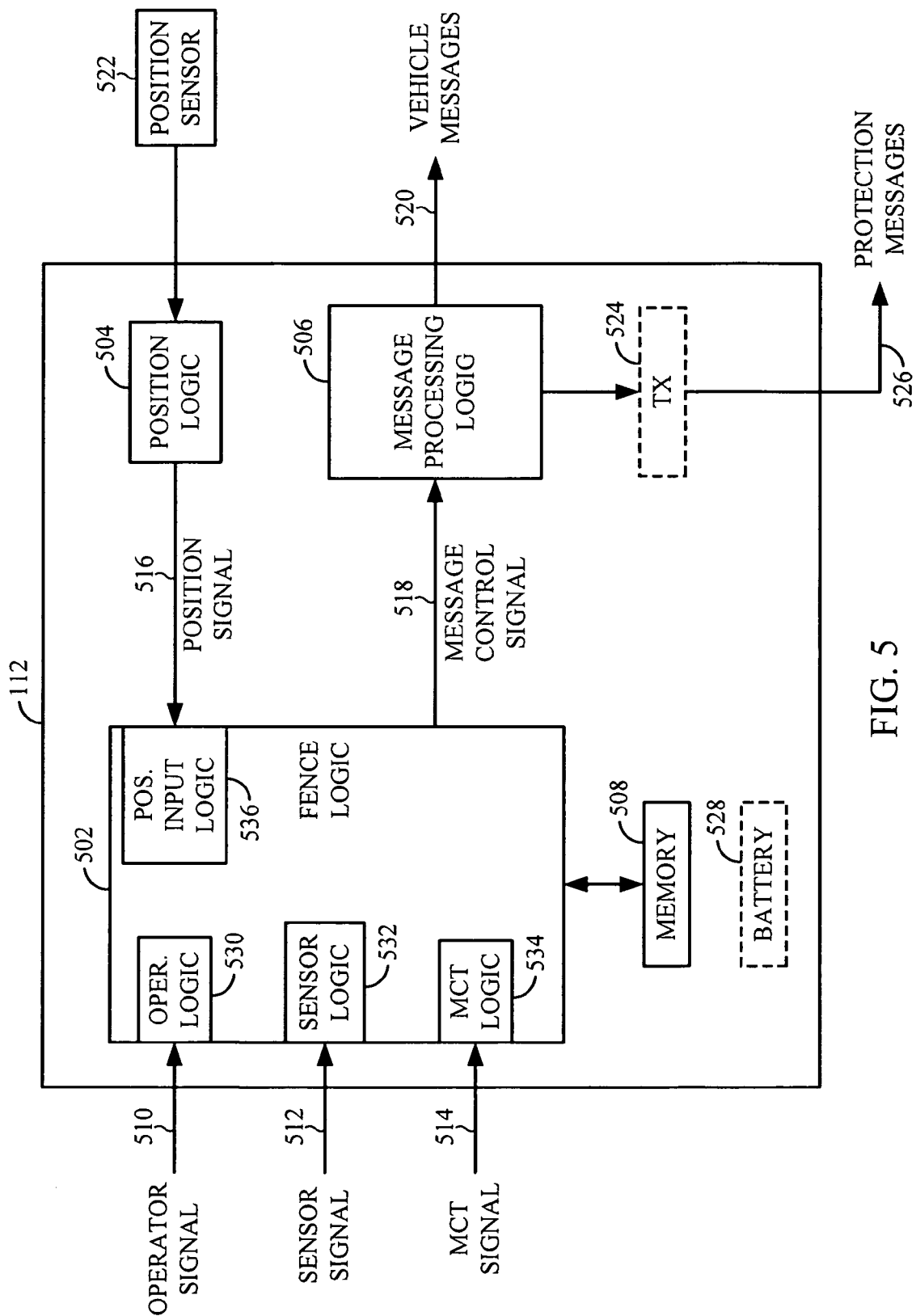
FIG. 5 shows a detailed functional diagram of one embodiment of the protection system of FIG. 1.

FIG. 5 shows a detailed functional diagram of one embodiment of the protection system 112. The protection system 112 comprises fence logic 502, position logic 504, message processing logic 506, and memory 508. The protection system 112 may also comprise an optional battery 528 and transmitter 524. The battery 528 and transmitter 524 allow the protection system 112 to operate in a stand-alone mode to provide one or more virtual fences.

In one embodiment, the protection system 112 is located in a detachable trailer portion of a delivery vehicle. In this configuration, the protection system 112 operates by supplying its own power and communication transmitter. Thus, it is possible for the protection system 112 to protect the trailer and/or its cargo when the trailer is detached from a tractor portion. In another embodiment, the protection system 112 is located in a tractor portion of a delivery vehicle and operates to provide protection fences to protect the tractor portion of the delivery vehicle from unauthorized movement.

The fence logic 502 may comprise a processor, CPU, gate array, logic, discreet circuitry, software, or any combination of hardware and software. The fence logic 502 includes operator input logic 530 that receives operator signal 510 from various operator input devices. For example, the signal 510 may be coupled to a keypad, mouse, touch screen, or any other type of operator input device, thereby allowing an operator to input information into the fence logic 502. The input logic 530 may also output information to the operator via a display, LED or any other type of output device.

The fence logic 502 also includes sensor input logic 532 to receive sensor signal 512 that comprises input from various vehicle sensors. For example, the sensor signal 512 provides information to the fence logic 502 from sensors located in the tractor 116 and/or trailer 118 portion of the delivery vehicle. For example, the sensors may include an engine sensor, ignition sensors, and door sensors. The sensors may also include a connection sensor that indicates whether or not a trailer portion of the delivery vehicle is hooked or unhooked from a tractor portion. In other embodiments, the determination of whether or not a trailer is connected to a tractor is determined implicitly, such as by determining if a trailer power bus is energized, or the detection of other electrical signals. Thus, virtually any type of vehicle sensor may be used to provide sensor input signals to the sensor input logic 532 via the sensor signal 512.

In one embodiment, the fence logic 502 also comprises MCT input logic 534 to receive MCT signal 514 that allows the MCT and the fence logic 502 to communicate with each other. The MCT may be located in the tractor portion of the delivery vehicle. The MCT input logic 534 operates to receive information from the MCT regarding transmitted messages between the MCT and a central station. For example, route messages, vehicle status messages, driver status messages and any other message transmitted to the central station may be discovered by the fence logic 502 via the MCT input logic 534. In addition, MCT signal 514 may comprise a deactivation command sent by central station 102 which causes fence logic 502 to disable any fences that may be active. In one embodiment, the MCT input logic 534 includes output logic to transmit protection information to the MCT. For example, in one embodiment, the protection information may describe fence activations, fence deactivations, fence positions, trailer position, boundary violations and other fence related information. Thus, the fence logic 502 may transmit the protection information to the central station using the MCT.

The position logic 504 may comprise a processor, logic, discreet circuitry, radio receiver, software, or any combination of hardware and software. The position logic 504 operates to determine a position of the delivery vehicle. In one embodiment, the position logic 504 comprise a GPS receiver that operates to receive GPS satellite signals and process those signals to determine the vehicle's exact position. For example, in this embodiment, the position sensor 522 is a GPS antenna operable to receive GPS signals.

In another embodiment, the position logic 504 comprises logic to compute the vehicle's position using ground based sensor inputs. For example, the position sensor 522 may comprises RF, optical, magnetic, or any other type of sensor that can be used to detect when the vehicle enters a specific area. For example, a vehicle repair center may include IR transmitters at its entry point so that when the vehicle is driven through the entry point, the position sensors 522 detect the IR transmission and provide an input to the position logic 504, which processes this input to determine the vehicle's position. Thus, any type of position sensor 522 may be used to allow the position logic 504 to detect a position of the vehicle.

Once the position logic 504 has determined the vehicle's position, a position signal 516 is sent to position input logic 536 of the fence logic 502. The position signal 516 comprises an indicator that indicates the position of the delivery vehicle. The position input logic 536 receives the position signal 516 and provides it to other portions of the fence logic 502 that may then use this information to activate or deactivate one or more fences, or determine that the vehicle has crossed a fence boundary, and in response, initiate an alarm condition. For example, once the fence logic 502 knows the position of the delivery vehicle, the fence logic 502 may establish a virtual boundary at a selected distance from that position. This boundary may comprise fixed Earth coordinates at a selected distance from the vehicle's position. When the vehicle is moved, the position logic 504 determines a new vehicle position that is input to the fence logic 502 via the position input logic 536, and this new position can be compared to the fixed boundary. If the fence logic 502 determines that the vehicle's new position is outside the region defined by the fixed virtual boundary, the fence logic 502 generates an alarm condition. In one embodiment, the vehicle's position is determined automatically at predetermine time intervals. For example, the position logic 504 determines the vehicle's position every minute. In another embodiment, the position input logic 536 includes logic to request a position update from the position logic 504. Thus, it is possible for the fence logic 502 to obtain a vehicle position at any given time.

The message processing logic 506 may comprise a processor, CPU, gate array, hardware logic and/or discreet circuitry, software, and/or any combination of hardware and software. The message processing logic 506 is coupled to the fence logic 502 to receive a message control signal 518. The message processing logic 506 operates to generate messages used during operation of the protection system 112. In one embodiment, messages are pre-stored directly in the message processing logic 506. In another embodiment, messages are stored in memory 508 and are sent to the message processing logic 506 via the message control signal 518. In another embodiment, the memory 508 is coupled directly to message processing logic 506 and messages are accessed directly as needed. In another embodiment, the message processing logic 506 assembles specific messages from real-time information sent in the message control signal 518, such as the current time. Thus, the message processing logic 506 may use virtually any combination of stored and real-time information to generate the various messages output from the protection system 112.

In one embodiment, the message processing logic 506 outputs vehicle messages 520 that are used to control various vehicle systems. For example, the vehicle messages 520 may be transmitted to a central vehicle processor (not shown) that uses the messages to control the vehicle's systems. For example, the vehicle's ignition, lights, horn, door locks, cargo door locks or any other vehicle system may be controlled in response to the vehicle messages 520. Thus, if the fence logic 502 determines that the vehicle has crossed a fence boundary thereby causing an alarm condition, the fence logic 502 transmits a message control signal 518 that causes a selected vehicle message 520 to be output from the message processing logic 506. The selected vehicle message 520 may cause the central vehicle processor to sound a vehicle alarm, activates lights, activate the brakes, lock the cargo doors, turn off the vehicle's ignition, or otherwise disable the vehicle.

In one embodiment, the protection system 112 includes a transmitter 524 that is coupled to the message processing logic 506. In this embodiment, the message processing logic 506 operates to output protection messages 526 that are transmitted from the transmitter 524 to a remote location, such as a central station 102. Thus, any information or activity occurring at the protection system 112 can be reported to the central station using the transmitter 524. For example, the vehicle's current position, actives fences, boundary violations, or any other information available to the protection system 112 may be transmitted to a central station using the transmitter 524. The same information may be transmitted to the central station via the MCT if the fence logic is coupled to the MCT via the MCT signal 514.

In one embodiment, the types, parameters, sizes, and other criteria of the virtual fences provided by the protection system 112 are stored in the memory 508. Thus, the protection system 112 operates to provide a virtual fence having any size or shape to protect a delivery vehicle and its cargo. In one embodiment, information about the protection fences and any other system parameters or information is loaded into the protection system 112 at the time of manufacture. In another embodiment, this information may be downloaded to the protection system 112 using, for example, communications received by the MCT and sent to the fence logic 502 via the MCT signal 514. In another embodiment, the information may be input to the protection system 112 via the operator input 510. For example, the information may be stored on a floppy disk, CDROM, magnetic tape, flash memory card, or any other memory device and downloaded into the protection system 112 via the operator input signal 510. Thus, any type of computer readable medium may comprise program instructions, data or other information that when executed by protections system 112 provides the protection functions described herein.

It should be understood that the elements of the protection system 112 shown in FIG. 5 represent one embodiment, and that implementation of the protection system 112 could be achieved in any number of ways using greater, fewer, or different functional elements. For example, the fence logic 502, position logic 504, and message processing logic 506 could all be implemented in a computer program executed by one or more processors.

During operation of the protection system 112, one or more fences are activated or deactivated to protect the delivery vehicle and its cargo. In one embodiment, fences are activated or deactivated based the receipt of a protection signal. In one embodiment, the protection signal comprises one or more of the following signals.

1. Position signal 516
2. Operator signal 510
3. Sensor signal 512
4. MCT signal 514

In one embodiment, the protection system 112 processes the position signal 516 to activate or deactivate one or more fences. For example, if the fence logic determines that the vehicle is entering a fixed service location or authorized stopping area, the protection system 112 automatically activates a fence to protect the vehicle and its cargo.

In another embodiment, the protection system 112 processes the operator input signal 510 to activate or deactivate one or more fences. For example, the vehicle operator inputs a special code to the protection system 112, which automatically activates or deactivates one or more fence types.

In another embodiment, the protection system 112 processes the sensor input 512 to activate or deactivate one or more fences. The sensor input 512 may comprise digital or analog signals from one or more sensors attached to the delivery vehicle. The protection system 112 operates to process these sensor inputs 512 to determine that the vehicle is stopped, the ignition is off, the engine RPMs are below a selected threshold, the operator door is open, cargo doors are open, the trailer is unhooked from the tractor, or any other condition of the delivery vehicle. Once the status of the delivery vehicle is determined, one or more fences may be automatically activated or deactivated by the protection system 112 to protect the vehicle and its cargo. For example, if the protection system 112 determines that the trailer portion of a delivery vehicle is unhooked from the tractor portion, a protection fence is activated around the trailer portion to protect the trailer and its cargo.

In another embodiment, the protection system 112 processes the MCT input 514 to activate or deactivate one or more fences. The MCT input provides information about communications between the vehicle and a central station. For example, if a message is sent to the central station that the vehicle is "in-route" to its next destination, the protection system 112 may also discover this message via the MCT input 514, and in response, activate a route fence that restricts the vehicle to the predefined delivery route. Thus, the protection system 112 operates to activate and deactivate one or more fences based on a variety of protection events. In another embodiment, the protection system 112 uses any combination of the protection signals to activate or deactivate one or more virtual fences.

Protection Events

In one or more embodiments, the protection system 112 operates to activate or deactivate one or more fence types based on protection events that may occur during the pickup, transportation and delivery of cargo. In one embodiment, the protection events are characterized as activation and deactivation events. An activation event is an event that causes the protection system 112 to activate one or more fences. A deactivation event is an event that causes the protection system 112 to deactivate one or more fences. Events may occur in sequence or several events may occur at the same time as the delivery vehicle proceeds along the delivery route. In one embodiment, the same event may cause the deactivation of one fence and the activation of another fence. In effect, this event causes a fence change to occur.

Sub-Events

Each protection event may be characterized into one or more sub-events. For the purposes of this description, three categories of sub-events are described, however, in one or more embodiments, it is possible to have more, less, or different sub-events than those described. The categories of sub-events are as follows.

| | |
|---|---|
| Vehicle: | A vehicle sub-event is an event that occurs because of an activity involving the delivery vehicle. For example, a vehicle sub-event occurs when the delivery vehicle enters a predefined location. |
| Trailer: | A trailer sub-event is an event that occurs because of an activity involving the trailer, or cargo-carrying portion of a delivery vehicle. For example, a trailer sub-event occurs when the trailer is unhooked or disconnected from a tractor portion. |
| Driver: | A driver sub-event is an event that occurs because of an activity involving the driver of the delivery vehicle. For example, a driver sub-event occurs when the driver stops the delivery vehicle to rest and enters a driver status code into the MCT. |

The following is a more detailed description of the protection sub-events and how one or more embodiments of the protection system operate to activate one or more fences in response.

Vehicle Sub-Events

The vehicle sub-events comprise events involving the delivery vehicle that result in the protection system activating or deactivating one or more fences. The following is a sample list of vehicle sub-events that cause the protection system to activate or deactivate the identified fence type. It should be noted the list is not exhaustive and that other vehicle sub-events can be defined that cause the protection system to activate or deactivate one or more fences.

1. Boundary Fence

A boundary fence is activated and deactivated by the protection system in response to the following vehicle sub-events.

| | |
|---|---|
| a. Vehicle Location | Activate: The protection system determines that the vehicle entered a predefined location (i.e., vehicle enters a pick-up location) and activates a boundary fence around the predefined location. The location may be determined by GPS, IR bar code reader, WIFI technology, RFID tag, triangulation, or infrared ID.<br>Deactivate: Deactivation code entered into protection system, either locally or remotely. |

2. Perimeter Fence

A perimeter fence is activated and deactivated by the protection system in response to the following vehicle sub-events.

| | |
|---|---|
| a. Vehicle Motion | Activate: The protection system determines that the vehicle stopped moving for a selected time interval (i.e., using the vehicle sensors) and activates a perimeter fence around the vehicle.<br>Deactivate: Deactivation code entered into protection system, either locally or remotely. |

3. Route Fence

A route fence is activated and deactivated by the protection system in response to the following vehicle sub-events.

| | |
|---|---|
| a. Vehicle Message | Activate: The protection system activates a route fence along the predefined delivery route after determining that the vehicle has started along the delivery route by processing an "In-route message" transmitted from the vehicle.<br>Deactivate: Deactivation code entered into protection system, either locally or remotely. |

Trailer Sub-Events

The trailer sub-events comprise events involving the trailer or cargo-carrying portion of the delivery vehicle that result in the protection system activating or deactivating one or more fences. The following is a sample list of trailer sub-events that cause the protection system to activate or deactivate the identified fence type. It should be noted the list is not exhaustive and that other trailer sub-events can be defined that cause the protection system to activate or deactivate one or more fences.

1. Boundary Fence

A boundary fence is activated or deactivated by the protection system in response to the following trailer sub-events.

| | |
|---|---|
| a. Trailer Location | Activate: The protection system determines that the trailer entered a predefined location (i.e., trailer enters a pick-up location) and activates a boundary fence around the predefined location.<br>Deactivate: Deactivation code entered into protection system, either locally or remotely. |

2. Perimeter Fence

A perimeter fence is activated or deactivated by the protection system in response to the following trailer sub-events.

| | |
|---|---|
| a. Trailer Motion | Activate: The protection system determines that the trailer has stopped moving for a selected time interval and activates a perimeter fence around the trailer.<br>Deactivate: Deactivation code into protection system, either locally or remotely. |
| b. Trailer unhooked | Activate: The protection system determines that the trailer has been unhooked from a tractor and activates a perimeter fence around the trailer.<br>Deactivate: The protection system determines that the trailer has been hooked to a tractor. A deactivation code may also be used in conjunction with hook-up detection. |

3. Route Fence

A route fence is activated or deactivated by the protection system in response to the following trailer sub-events.

| | |
|---|---|
| a. Vehicle Message | Activate: The protection system activates a route fence along the predefined delivery route after processing an "In-route message" transmitted from the vehicle.<br>Deactivate: Deactivation code entered into protection system, either locally or remotely. |

Driver Sub-Events

The driver sub-events comprise events involving the driver of the delivery vehicle that result in the protection system activating or deactivating one or more fences. The following is a sample list of driver sub-events that cause the protection system to activate or deactivate the identified fence type. It should be noted the list is not exhaustive and that other driver sub-events can be defined that cause the protection system to activate or deactivate one or more fences.

1. Boundary Fence

A boundary fence is activated by the protection system in response to the following driver conditions.

| | |
|---|---|
| a. Arrival Message | Activate: The protection system activates a boundary fence around the predefined location after it determines that the driver entered a predefined message for transmission to the central station (i.e., the driver enters an arrival message upon arrival at a pick-up location).<br>Deactivate: Deactivation code entered into protection system, either locally or remotely, or the transmission of a message indicating departure from the pick-up location. |

2. Perimeter Fence

A perimeter fence is activated by the protection system in response to the following driver conditions.

| | |
|---|---|
| a. Driver Status Message | Activate: The protection system determines that the driver has entered a selected driving status, and in response, activates a perimeter fence around the vehicle. For example, in one embodiment, there are four driver status conditions, namely: driving, on-duty not driving, off-duty, or resting. In this example, a perimeter fence may be enabled if the driver entered a driving status of either resting or off-duty.<br>Deactivate: Deactivation code entered into protection system, either locally or remotely. Alternatively, the protection system determines that the driver has entered a second status message, such as "driving". |

3. Route Fence

A route fence is activated by the protection system in response to the following driver conditions.

| | |
|---|---|
| a. Vehicle Message | Activate: The protection system determines that the driver has transmitted an in-route message that indicates that the vehicle has started on its delivery route, and in response, activates a route fence along the predefined delivery route.<br>Deactivate: Deactivation code entered into protection system, either locally or remotely. |
| b. Driver Detour Message | Activate: The protection system determines that the driver has transmitted a detour message that indicates that the vehicle has started on a detour delivery route, and in response, activates a route fence along the detour delivery route.<br>Deactivate: Deactivation code entered into protection system, either locally or remotely. |

Figure 6:
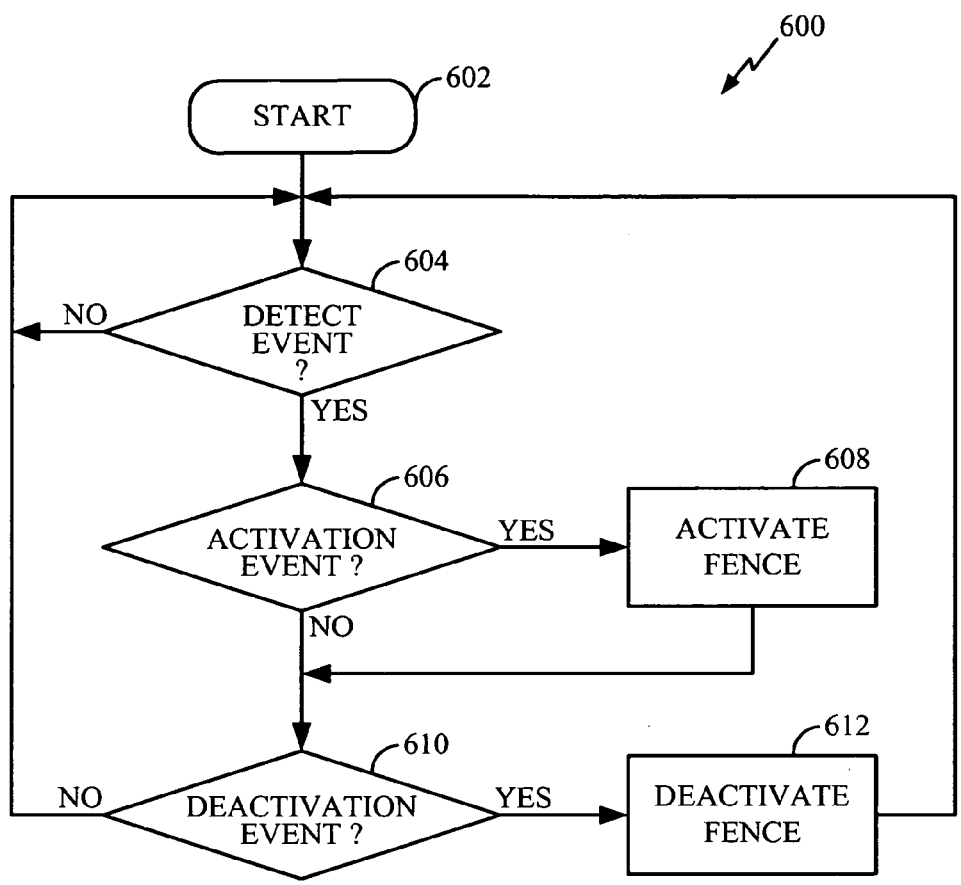
FIG. 6 shows one embodiment of a method for providing a virtual fence to protect a delivery vehicle and its cargo.

FIG. 6 shows one embodiment of a method 600 for providing a virtual fence to protect a delivery vehicle and/or its cargo. For example, the method 600 is suitable for use with one or more embodiments of the protection system described herein. For the following description, it will be assumed that a protection system is installed in a trailer portion of a delivery vehicle that is carrying cargo to be delivered to one or more delivery sites. For example, the delivery vehicle may be a tractor-trailer truck carrying a cargo of shipping containers to be delivered to one or more locations along a delivery route. Furthermore, it is assumed that the delivery vehicle includes an MCT to communicate with a central station using a wireless communication channel.

At block 602, the method starts when the protection system is powered on. For example, an authorized service person powers on the protection system in the delivery vehicle before the vehicle starts on its route.

At block 604, a test is performed to determine if a protection event has been detected. For example, the event may be activity related to vehicle position, vehicle sensors, driver activity or communication activity between the vehicle and a central station. If a protection event is detected, the method proceeds to block 606, and if not, the method waits for a protection event at block 604.

At block 606, a test is performed to determine if the detected protection event is an activation event. An activation event may be any event as described above relating to the operation or status of the vehicle, trailer, or vehicle operator. If the protection event is an activation event, the method proceeds to block 608. If the protection event is not an activation event, the method proceeds to block 610.

At block 608, a protection fence is activated based on the type of activation event. For example, a boundary, perimeter, or route fence is activated to protect the vehicle and its cargo. After the protection fence is activated, the method proceeds to block 610.

At block 610, a test is performed to determine if the protection event is also a deactivation event. For example, in one embodiment, a protection event may be both an activation event and a deactivation event. For example, a protection event may occur when a vehicle status code is entered into the protection system that may activate one type of fence and deactivate an existing fence. If the protection event is a deactivation event, the method proceeds to block 612. If the protection event is not a deactivation event, the method proceeds to block 604.

At block 612, a protection fence is deactivated based on the type of protection event. For example, a boundary, perimeter, or route fence is deactivated by the protection system. After the protection fence is deactivated, the method proceeds to block 604.

Figure 7:
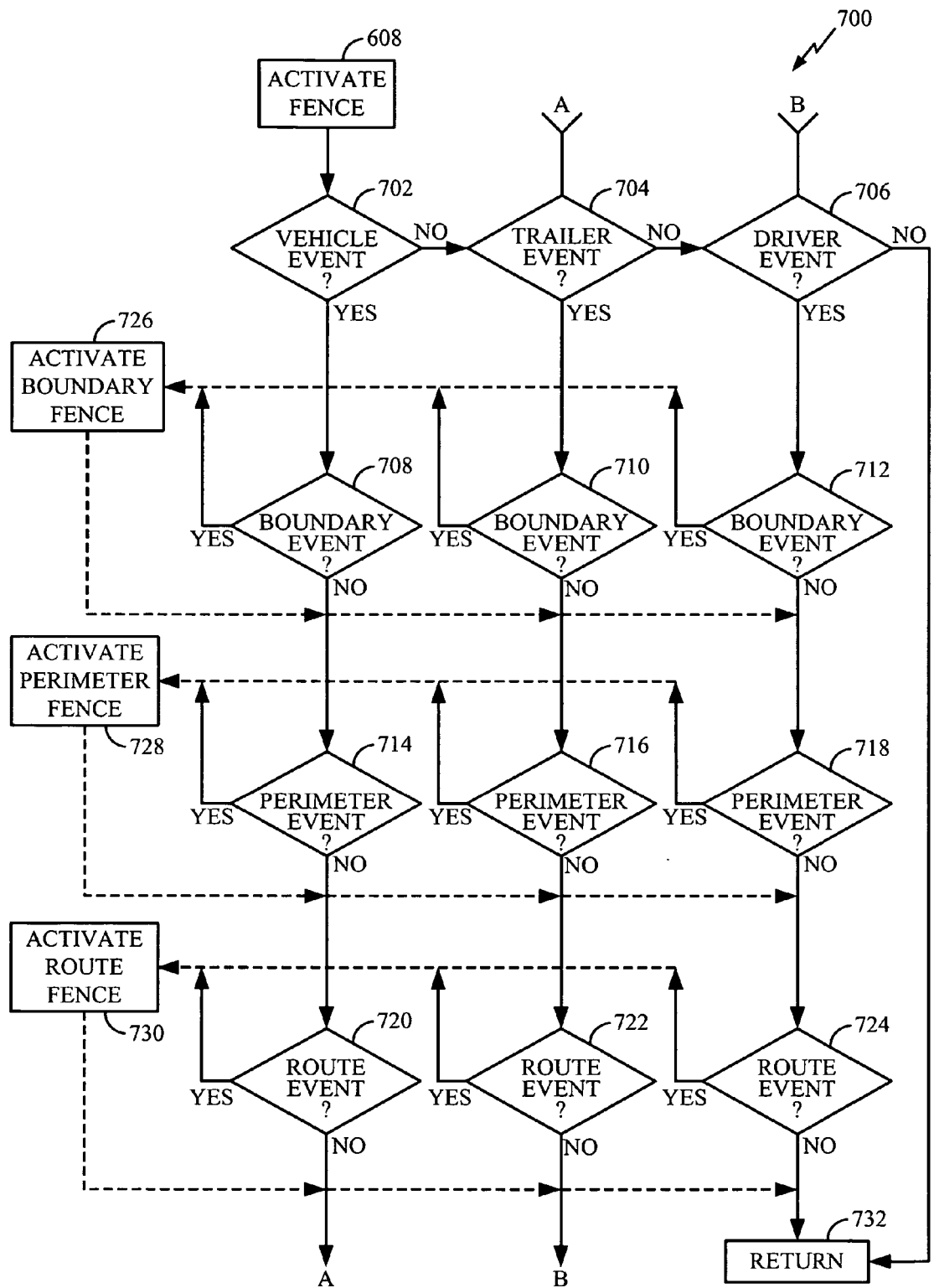
FIG. 7 shows one embodiment of a method for activating one or more virtual fences to protect a delivery vehicle and its cargo.

FIG. 7 shows one embodiment of a method 700 for activating one or more virtual fences to protect a delivery vehicle and/or its cargo. For example, the method 700 provides one embodiment for the activation block 608 of the method 600. Because it is possible for one activation event to activate more than one fence, the method 700 operates to sequentially test the activation event to determine if more than one fence should be activated.

At block 608, it is determined that a fence is to be activated based on the occurrence of an activation event. For example, the method 600 determines that an activation event has occurred that requires the activation of one or more fences to protect the vehicle and it cargo.

At blocks 702, a test is performed to determine if the detected activation event is a vehicle event. If the activation event is not a vehicle event, the method proceeds to block 704 to determine if the activation event is a trailer event. If the activation event is not a trailer event, the method proceeds to block 706, to determine if the activation event is a driver event. For the following description, it will be assumed that the activation event is a vehicle event and that the method proceeds from block 702 to block 708.

At block 708, a test is performed to determine if the detected vehicle event is a boundary protection event. For example, a boundary protection event occurs when the delivery vehicle enters a delivery location. If it is determined that the vehicle event is a boundary event, the method proceeds to block 726. If it is determined that the vehicle event is not a boundary event, the method proceeds to block 714.

At block 726, a boundary fence is activated in response to the vehicle event. For example, the protection system 112 activates a boundary fence that encloses a predetermined area around the vehicle's current location. Since the vehicle event may activate more than one type of fence, the method proceeds to block 714.

At block 714, a test is performed to determine if the detected vehicle event is a perimeter protection event. For example, a perimeter protection event occurs when the delivery vehicle stops for a predetermined time interval. If it is determined that the vehicle event is a perimeter event, the method proceeds to block 728. If it is determined that the vehicle event is not a perimeter event, the method proceeds to block 720.

At block 728, a perimeter fence is activated in response to the vehicle event. For example, the protection system 112 activates a perimeter fence that encloses the current vehicle location. Since the vehicle event may activate more than one type of fence, the method proceeds to block 720.

At block 720, a test is performed to determine if the detected vehicle event is a route protection event. If it is determined that the vehicle event is a route event, the method proceeds to block 730. If it is determined that the vehicle event is not a route event, the method follows path A to block 704.

At block 704, a test is performed to determine if the activation event is a trailer event. If the activation event is a trailer event, the method proceeds to blocks 710, 716, and 722 in a manner similar to that described above. Thus, at the output of block 722, any or all of a boundary fence, perimeter fence and route fence may be activated based on the trailer event. At the completion of block 722, the method follows path B to block 706.

At block 706, a test is performed to determine if the activation event is a driver event. If the activation event is a driver event, the method proceeds to blocks 712, 718, and 724 in a manner similar to that described above. Thus, at the output of block 724, any or all of a boundary fence, perimeter fence and route fence may be activated based on the driver event. At the completion of block 724, the method proceeds to block 732 to return to the method 600.

It should be noted that the method 700 is just one embodiment for a method to provide one or more virtual fences to protect a delivery vehicle and its cargo. It is also possible to make minor changes, additions, and deletions, combine steps, or rearrange steps all within the scope of the described embodiment.

In another embodiment, it is also possible for the protection system to automatically deactivate one or more fences in response to a protection event. For example, in a method similar to the method 700, the following sequence of steps can be used to provide for automatic deactivation.

1. Detect a deactivation event.
2. Determine whether the deactivation event is a vehicle, trailer, or driver deactivation event.
3. Deactivate an existing fence based on the deactivation event.

In one embodiment, automatic activation and deactivation occurs as a result of a driver sub-event. For example, assuming a delivery vehicle is at a delivery location and currently has a boundary fence activated. The vehicle operator makes a cargo delivery at this location and then begins in-route to the next delivery site. Prior to leaving the current delivery site, the operator transmits an "in-route" message to a central station. The protection system operates to discover this transmitted message and automatically activates a route protection fence that restricts the vehicle to a predefined route. In addition, the protection system automatically deactivates the existing boundary fence so that the vehicle may proceed to its next delivery site without triggering an alarm condition. As a result, the transmitted message acts as both an activation and deactivation event that causes the protection system to automatically activate the route fence and automatically deactivates the existing boundary fence. Thus, the burden of activating and deactivating fences to protect the vehicle and its cargo is removed from the vehicle operator.

Figure 8:
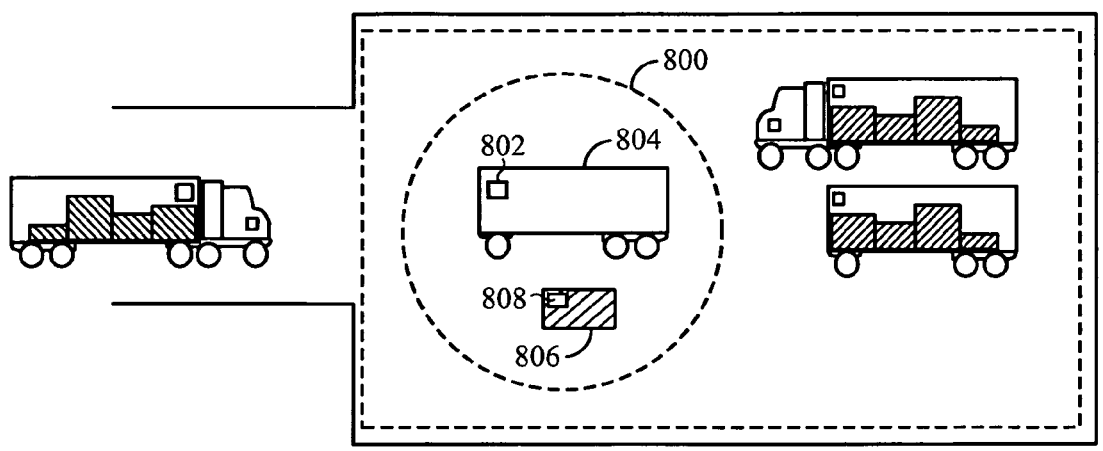
FIG. 8 shows one embodiment of a perimeter fence for use with a trailer or other type of cargo-carrying delivery vehicle.

FIG. 8 shows one embodiment of a perimeter fence 800 for use with a trailer 804 or other type of cargo-carrying delivery vehicle. In this embodiment, protection system 802 established the perimeter fence 800 in accordance with the described embodiments. For example, the protection system 802 establishes the perimeter fence 800 around the trailer 804 after it is disconnected from a tractor. The perimeter fence 800 operates to protect the trailer 802 from unauthorized movement that would take the trailer 802 outside the boundary of the perimeter fence 800.

The trailer 804 contained cargo 806, which is unloaded from the trailer 804 and shown within the perimeter fence 800. In one embodiment, the cargo 806 comprises a position detector 808 that communications with the protection system 802, so that the location of the cargo 806 can be determined by the protection system 802. For example, in one embodiment, the position detector 808 comprises an RFID tag that can be read when in close proximity to the trailer 804. Once the cargo 806 is moved a specific distance from the trailer 804, the RFID tag cannot be read and it is determined that the cargo 806 has moved outside the perimeter 800. However, virtually any type of position system can be used to determine whether or not the cargo 806 is either within the perimeter fence 800 or within another predefined region near the trailer 804.

Because the protection system 802 can determine the location of the cargo 806, the perimeter fence 800 operates to protect both the trailer 804 and the unloaded cargo 806. For example, if the cargo 806 is moved outside the boundary of the perimeter fence 800, the protection system 802 detects this condition and activates an alarm condition. Thus, it is possible for the protection system 802 to protect both the trailer 804 and the cargo 806 from unauthorized movement outside the boundary of the perimeter fence 800.

A system for providing a virtual vehicle boundary has been described that operates to accurately determine when a vehicle or its cargo leaves a predetermined region or location. Accordingly, while one or more embodiments have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

What is claimed is:

1. A protection system operable to provide a virtual fence around a vehicle comprising:
    input logic operable to receive a protection signal, indicative of other than vehicle location, from the vehicle; and
    fence logic, coupled to said input logic, being operable to automatically activate a first virtual fence selected from a plurality of virtual fences in response to said protection signal being indicative of one of a plurality of activation events involving vehicle motion and not having vehicle engine dependence, said fence logic operable to concurrently automatically activating a second virtual fence from the plurality of virtual fences, to be used simultaneously in conjunction with said first virtual fence.

2. A protection system as recited in claim 1 wherein said second virtual fence is selected from a plurality of virtual fences.

3. A protection system as recited in claim 1 wherein said first and second virtual fence are operable to be switched on and off.

4. A protection system as recited in claim 1 wherein said first virtual fence is a route fence, said route fence extending around said vehicle along a vehicle route.

5. A protection system as recited in claim 1 wherein said first virtual fence and said second virtual fence are operable to activate simultaneously.

6. A protection system as recited in claim 1 wherein said input logic is a sensor input logic and the protection signal is a sensor input signal.

7. A protection system as recited in claim 6 wherein said vehicle comprises a tractor portion and a trailer portion and said sensor input signal indicates when the trailer portion is unhooked from the tractor portion.

8. A protection system as recited in claim 1 being further operable to generate an alarm condition in response to a breach of the first and second virtual fence.

9. A protection system as recited in claim 8 wherein the alarm condition comprises a member from the group consisting of activation of a visual alarm, activation of an audio alarm, activation of one or more vehicle systems or a combination thereof.

10. A protection system as recited in claim 8 comprising a means for transmission of a message to a central station.

11. A protection system as recited in claim 9 wherein said activation of one or more vehicle systems consists of activation of one or more door locks or activation of vehicle brakes to prevent vehicle movement.

12. A method of providing a virtual fence for a vehicle comprising:
    detecting a protection event, indicative of other than vehicle location, from the vehicle;
    determining that the protection event is one of a plurality of activation events involving vehicle motion and not having vehicle engine dependence;
    automatically activating a first selected virtual fence from a plurality of virtual fences based on the activation event;
    automatically activating a second selected virtual fence from said plurality of virtual fences based on the activation event, said first and second virtual fences operating simultaneously; and
    generating an alarm if the vehicle breaches the first and second selected virtual fence.

13. A method of providing a virtual fence as recited in claim 12 wherein said first and second virtual fences are selected from a group consisting of a boundary fence, perimeter fence, and a route fence.

14. A method of providing a virtual fence as recited in claim 12 wherein said first or second virtual fence is operable to be switched on and off.

15. A method of providing a virtual fence as recited in claim 12 wherein the step of generating comprises a member from the group consisting of activating a visual alarm, activating an audio alarm, activating one or more vehicle systems or a combination thereof.

16. A method of providing a virtual fence as recited in claim 12 wherein the step of generating an alarm comprises transmitting a message to a central station.

17. A method of providing a virtual fence as recited in claim 15 wherein said activation of one or more vehicle systems consists of activation of one or more door locks or activation of vehicle brakes to prevent vehicle movement.

18. A method as recited in claim 17 wherein said first virtual fence and said second virtual fence are activated simultaneously.

19. A computer product, comprising: computer-readable medium comprising instructions for providing a virtual fence for use with a delivery vehicle, the computer readable-medium including:
- at least one instruction for causing a computer to detect a protection event, indicative of other than vehicle location, from the vehicle;
- at least one instruction for causing a computer to determine that the protection event is an activation event involving vehicle motion and not having vehicle engine dependence;
- at least one instruction for causing a computer to automatically activate a first selected virtual fence from a plurality of virtual fences; and
- at least one instruction for causing a computer to activate a second virtual fence from a plurality of virtual fences, said first and second virtual fences operating simultaneously.

20. A computer product as recited in claim 19 wherein the computer readable-medium further comprises at least one instruction for causing a computer to generate an alarm condition in response to violation of a predetermined boundary established by one or more virtual fences resulting in an event consisting of activation of a visual alarm, an audio alarm, one or more vehicle systems or a combination thereof.

21. A protection system operable to provide a virtual fence around a vehicle comprising:
- means for receiving a protection signal, indicative of other than vehicle location, from the vehicle; and
- means for automatically activating a first virtual fence selected from a plurality of virtual fences in response to said protection signal being indicative of one of a plurality of activation events involving vehicle motion and not having vehicle engine dependence, said means for automatically activating operable to concurrently automatically activate a second virtual fence from the plurality of virtual fences, to be used simultaneously in conjunction with said first virtual fence.

22. A protection system as recited in claim 21 wherein said second virtual fence is selected from a plurality of virtual fences.

23. A protection system as recited in claim 21 wherein said first and second virtual fence are operable to be switched on and off.

24. A protection system as recited in claim 21 wherein said first virtual fence is a route fence, said route fence extending around said vehicle along a vehicle route.

25. A protection system as recited in claim 21 wherein said first virtual fence and said second virtual fence are operable to activate simultaneously.

26. A protection system as recited in claim 21 wherein said means for receiving a protection signal comprises sensor input logic and the protection signal is a sensor input signal.

27. A protection system as recited in claim 26 wherein said vehicle comprises a tractor portion and a trailer portion and said sensor input signal indicates when the trailer portion is unhooked from the tractor portion.

28. A protection system as recited in claim 21 further comprising means for generating an alarm condition in response to a breach of the first and second virtual fence.

29. A protection system as recited in claim 28 wherein the alarm condition comprises a member from the group consisting of activation of a visual alarm, activation of an audio alarm, activation of one or more vehicle systems or a combination thereof.

30. A protection system as recited in claim 28 further comprising a means for transmission of a message to a central station.

31. A protection system as recited in claim 29 wherein said activation of one or more vehicle systems consists of activation of one or more door locks or activation of vehicle brakes to prevent vehicle movement.

\* \* \* \* \*

UNITED STATES PATENT AND TRADEMARK OFFICE
CERTIFICATE OF CORRECTION

Page 1 of 1

PATENT NO.         : 7,612,668 B2
APPLICATION NO.    : 11/448344
DATED              : September 1, 2009
INVENTOR(S)        : Harvey It is certified that error appears in the above-identified patent and that said Letters Patent is hereby corrected as shown below:

Column 18, line 8, claim 23: "virtual fence" to read as --virtual fences--

Column 18, line 25, claim 28: "virtual fence." to read as --virtual fences.--

Signed and Sealed this
Seventeenth Day of May, 2011

David J. Kappos
*Director of the United States Patent and Trademark Office*